DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED MAY 4, 1976

946 O.G. 10

T946,011

FUEL/AIR SEPARATION SYSTEM FOR DIESEL ENGINES

Harold E. McClure, Wayzata, and Floyd D. Leinum, Bloomington, Minn., assignors to Thermo King Corporation, Minneapolis, Minn.

Continuation of application Ser. No. 476,176, June 3, 1974, which is a continuation of application Ser. No. 338,704, Mar. 7, 1973, both now abandoned. This application May 7, 1975, Ser. No. 575,287

Int. Cl. F02m *37/00*

U.S. Cl. 137—565

1 Sheet Drawing. 9 Pages Specification

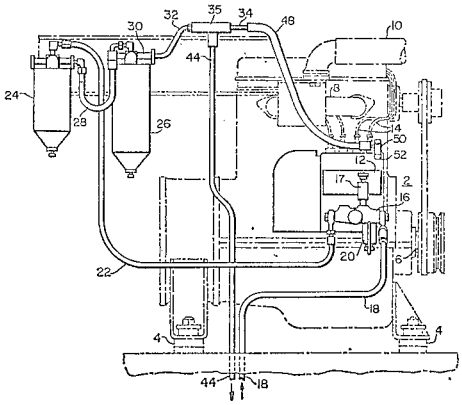

This invention relates to apparatus for removing gas from a diesel engine liquid fuel system. The apparatus includes a fluid conduit connected at one end to a fuel injection pump by means of a downwardly sloping confined fluid path and at the other end to a source of fuel in a closed fluid circuit. The fluid conduit includes both an inner tube member, which is adapted to convey portions of a fluid and gas mixture from the fuel source for transfer through the sloping tube to the injection pump, and an outer tube member, which is connected to the circuit and arranged concentrically with respect to the inner tube member and spaced therefrom. Gas that has accumulated in the receiver of the injection pump and sloping fluid path prior to starting the engine may travel up the sloping fluid path in a counter-current direction to the fluid flow and through portions of the space formed between the concentric tube members so as to escape back through the fluid circuit into the air space above the fuel in the fuel tank during filling of the fluid path with fuel when starting the diesel engine.

FUEL/AIR SEPARATION SYSTEM FOR DIESEL ENGINES
Original Filed May 7, 1975
FIG. 1
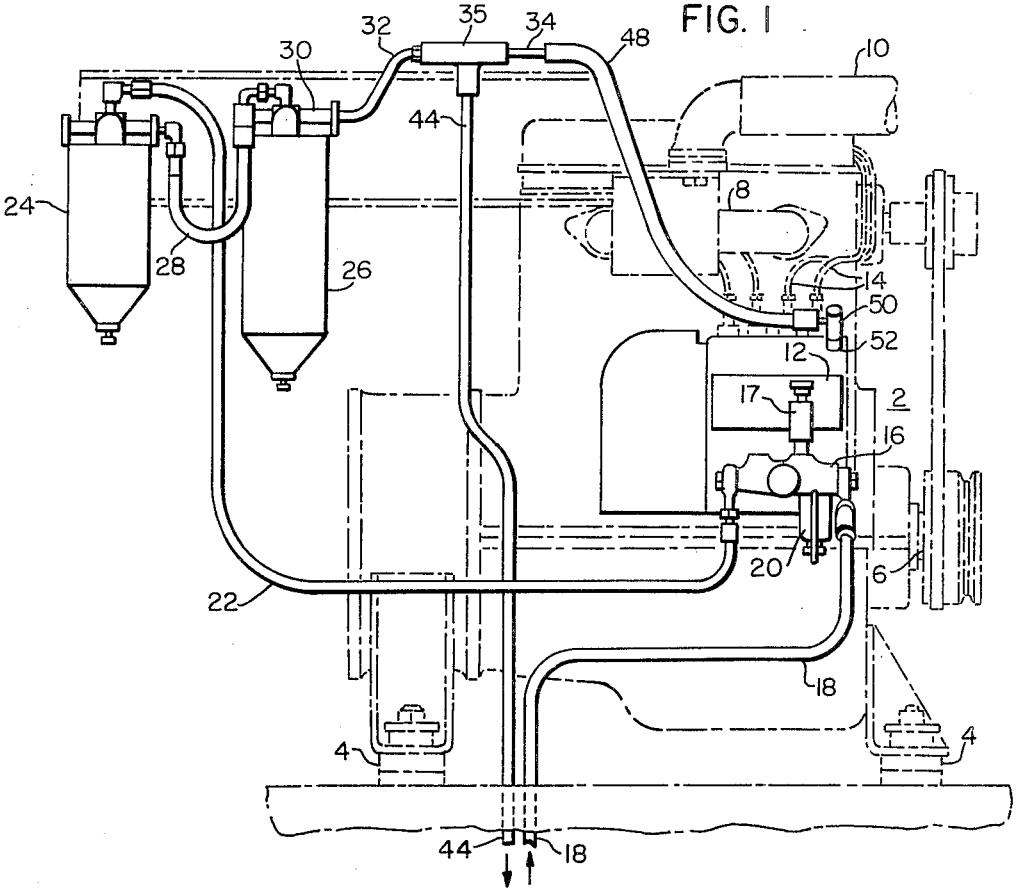
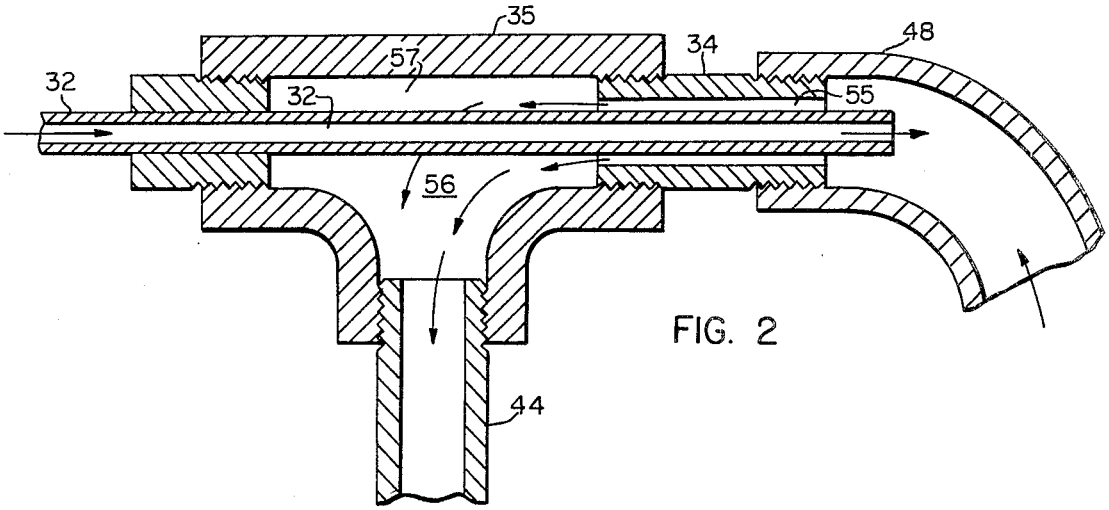
FIG. 2